(12) United States Patent
Sethuramalingam

(10) Patent No.: US 10,721,207 B1
(45) Date of Patent: Jul. 21, 2020

(54) PATTERN-BASED TECHNIQUES TO DISCOVER RELATIONSHIPS BETWEEN HOSTS

(71) Applicant: Amazon Technologies, Inc., Seattle, WA (US)

(72) Inventor: Ekanth Sethuramalingam, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 15/717,785

(22) Filed: Sep. 27, 2017

(51) Int. Cl.
| G06F 15/173 | (2006.01) |
| H04L 29/12 | (2006.01) |
| H04L 29/08 | (2006.01) |
| H04L 12/26 | (2006.01) |
| H04L 12/24 | (2006.01) |

(52) U.S. Cl.
CPC ........ H04L 61/2521 (2013.01); H04L 43/067 (2013.01); H04L 67/143 (2013.01); *H04L 41/046* (2013.01); *H04L 41/12* (2013.01); *H04L 61/1541* (2013.01)

(58) Field of Classification Search
CPC ............. H04L 61/2521; H04L 61/2528; H04L 61/2532; H04L 61/1541; H04L 43/067; H04L 67/143; H04L 41/046; H04L 41/12
See application file for complete search history.

(56) References Cited

U.S. PATENT DOCUMENTS

| 8,942,233 | B2 * | 1/2015 | Perkins | H04L 29/12066 370/238 |
| 9,246,827 | B1 * | 1/2016 | Orr | H04L 47/2458 |
| 2005/0235248 | A1 | 10/2005 | Victoria et al. | |
| 2008/0013524 | A1 * | 1/2008 | Hwang | H04L 29/06027 370/352 |
| 2014/0143416 | A1 | 5/2014 | Spinelli et al. | |
| 2014/0250086 | A1 * | 9/2014 | Shi | H04L 63/0442 707/692 |
| 2016/0080502 | A1 * | 3/2016 | Yadav | G06F 16/285 709/227 |
| 2016/0357957 | A1 * | 12/2016 | Deen | H04L 43/08 |
| 2017/0061138 | A1 * | 3/2017 | Lambert | H04L 63/18 |

(Continued)

Primary Examiner — Jonathan A Bui
(74) Attorney, Agent, or Firm — Robert C. Kowert; Kowert, Hood, Munyon, Rankin & Goetzel, P.C.

(57) ABSTRACT

A network discovery service provides pattern-based techniques to discover relationships between hosts in a network employing address translation. Agents are deployed to hosts of the network. To configure an agent, the discovery service obtains outbound transmission data from the agent, which indicates outbound network transmissions that were established by the host. One or more unique outbound transmission patterns are provided to the agent, based on analysis of the outbound transmission data. Inbound transmission data is then received from the agents. The inbound transmission data indicates transmission events at the host devices, as well as the source for each of the open and close events. The inbound transmission data is analyzed to identify occurrences of the outbound transmission patterns. Based on the analysis, communication relationships between the host devices is determined. In some cases, communication relationships between individual processes on different hosts may be determined.

20 Claims, 11 Drawing Sheets

(56) References Cited

U.S. PATENT DOCUMENTS

2017/0187844 A1* 6/2017 Bea ..................... H04L 49/557
2018/0295064 A1* 10/2018 Movsisyan ............ H04L 69/22
2018/0331905 A1* 11/2018 Toledo ................ H04L 43/0882

* cited by examiner

Outbound Transmission Pattern Assignments 302

| Source IP Address 304 | Source Port 306 | Dest. IP Address 308 | Dest. Port 310 | Protocol 322 | Pattern Timing 312 | Pattern Repeat/ Time 324 | |
|---|---|---|---|---|---|---|---|
| A | 50272 | X | 80 | TCP | 2, 4, 9, 180 | Repeat 100 times | — 314 |
| A | 49713 | Y | 443 | TCP | 3, 4, 7, 200 | Repeat for 30 minues | — 316 |
| B | 51973 | Z | 49789 | UDP | 5, 2, 3, 100 | Repeat 200 times | — 318 |
| A | 64777 | W | 8080 | TCP | not yet assigned | not yet assigned | — 320 |

*FIG. 3*

| Inbound Transmission Data 402 | | | | | | |
|---|---|---|---|---|---|---|
| Source IP Address 404 | Source Port 406 | Dest. IP Address 408 | Dest. Port 410 | Protocol 432 | Open Connection Timestamp 412 | Close Connection Timestamp 414 |
| Q | 61532 | S | 80 | TCP | 16:16:25.1 | 16:16:26.1 |
| Q | 61532 | S | 80 | TCP | 16:16:27.1 | 16:16:28.1 |
| Q | 61532 | S | 80 | TCP | 16:16:31.1 | 16:16:32.1 |
| P | 52555 | X | 50210 | UDP | 16:16:34.7 | N/A |
| Q | 61532 | S | 80 | TCP | 16:16:40.1 | 16:16:41.1 |
| R | 49512 | Y | 443 | TCP | 16:18:02.3 | 16:18:04.3 |
| Q | 61532 | S | 80 | TCP | 16:19:40.1 | 16:19:41.1 |
| Q | 61532 | S | 80 | TCP | 16:19:42.1 | 16:19:43.1 |

Row annotations (left): 416, 418, 420, 422, 424, 426, 428, 430

Row annotations (right): 2 seconds, 4 seconds, 9 seconds, 180 seconds, 2 seconds

FIG. 4

PATTERN-BASED TECHNIQUES TO DISCOVER RELATIONSHIPS BETWEEN HOSTS

BACKGROUND

Computer networks often include numerous host computing devices (e.g., servers) that host a variety of computing applications that communicate with each via network connections. For example, a process running on a particular server may send a request to another server to open a network connection between the particular server and the destination server in order to send data to and receive data from the other server. In many cases, a communication pathway between two servers includes a network address translator (NAT), which translates a server's network address and port information as packets traverse the NAT.

Typically, to discover communication relationships between various servers of a network, network connections between servers are monitored and IP addresses of network packets are used to identify relationships between servers. However, when network address translation is being used for a network, servers that are separated by a NAT may not be easily identified by the IP addresses in the network connections as seen by either of the servers due to modifications made to the network address and port information. As networks continue to grow in size and complexity, relationship discovery for various components of networks becomes even more challenging, particularly when network address translation is in play.

BRIEF DESCRIPTION OF THE DRAWINGS

FIG. 3 illustrates an example data structure that stores outbound transmission pattern assignments, according to some embodiments.

FIG. 4 illustrates an example data structure that stores inbound transmission data, according to some embodiments.

Figure 1:
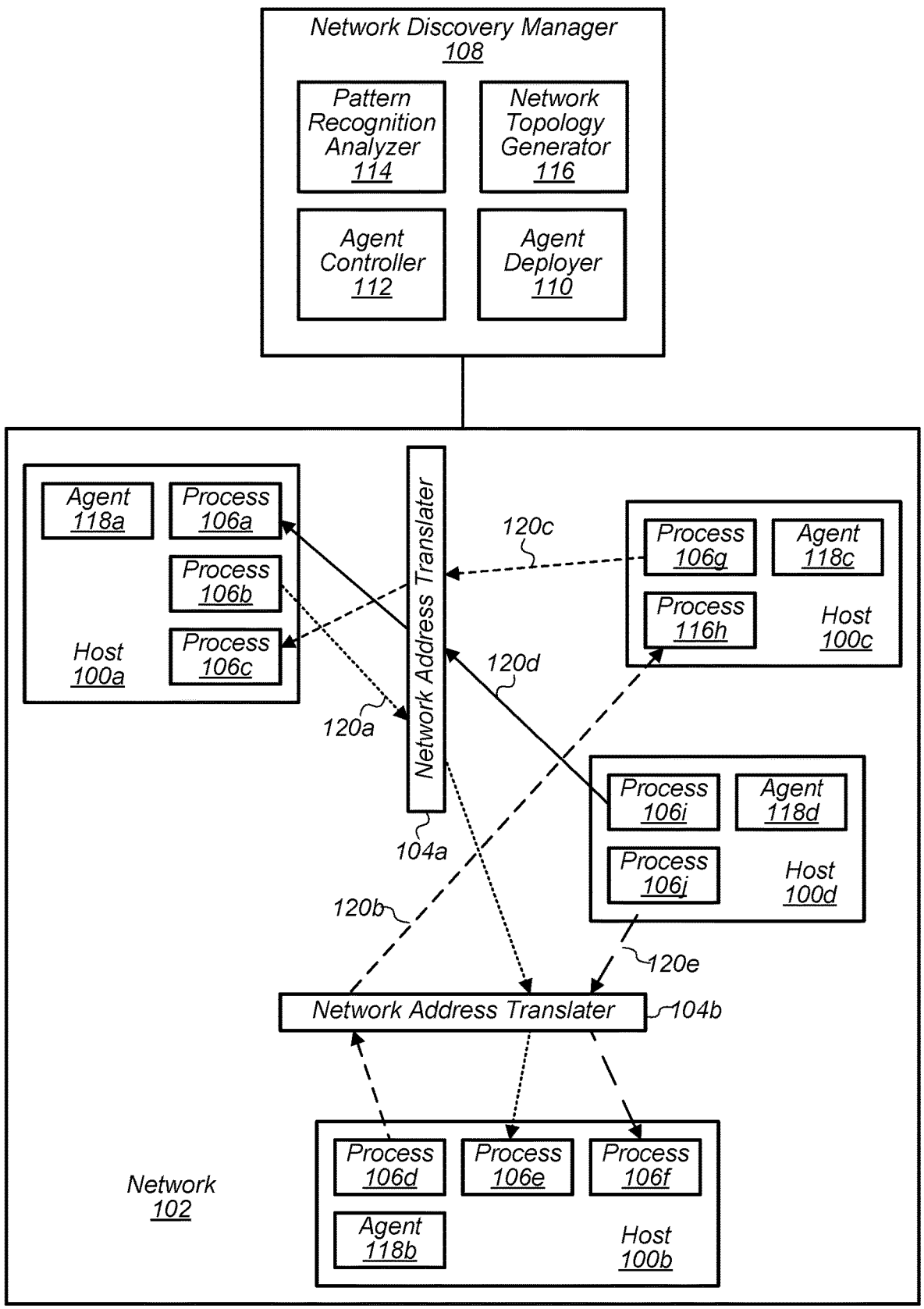
FIG. 1 illustrates a system for pattern-based techniques to discover relationships between hosts of a network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement pattern-based techniques to discover relationships between host computing devices ("hosts") of networks that employ network address translation (e.g., using one or more network address translator devices "NATs"). A network discovery manager deploys agents to host devices of one or more networks that employ network address translation. For each agent, the discovery manager determines one or more unique outbound transmission patterns and provides them to the agent for performing outbound transmissions from a host according to the outbound transmission patterns. An outbound transmission may include a request to open a connection to a destination or a request to close a connection to a destination (e.g., for TCP connections), a packet that is sent out to a target destination (e.g., according to a TCP or UDP protocol), or any other data sent out according to a network protocol.

Subsequently, the discovery manager receives inbound transmission data detected by the agents. The inbound transmission data indicates network transmission events (e.g., network connection open or close events corresponding to inbound connection creation and teardown activities, receiving a packet, etc.) detected at the host devices, as well as a source (e.g., network IP address and/or port) for each of the transmission events. The discovery manager analyzes the inbound transmission data to identify occurrences of the outbound transmission patterns, which may be used to identify source hosts. The discovery manager then determines communication relationships between host devices based on the analysis. The discovery manager may also provide a visualization of a network topology based on the communication relationships.

Identifying the communication relationships between host devices of a network may be useful for many reasons. For example, when migrating some or all functionality of a network to another location or to a remote provider network (e.g., a cloud computing network), it may be useful to determine communication relationships between host devices and/or processes running on the host devices. In some cases, a network security analysis may be performed to identify unsecure communication leaks and/or to identify hosts or processes on hosts that are communicating with other hosts or processes on other hosts but should not be for security reasons. Redundant and unnecessary communication relationships may be identified and eliminated or reduced, which may reduce network traffic and free up network bandwidth.

In some embodiments, a "network address" may refer to a network IP address or other identifier suitable for identifying and/or communicating with a host connected to a network. In various embodiments, "address translation" reference to any "translation" action may refer network address translation of a network address by a NAT. In some embodiments, a "host" may be any computing device (e.g., server), hardware component, or software component implemented on one or more hardware components that may be assigned a network address and/or host one or more processes and/or implement network connections with other hosts or send/receive data packets to/from other hosts. In some embodiments, an "endpoint" may be one or more computing devices and/or one more services that are part of a local network or a remote network, such that information may be transmitted to or from the endpoint via one or more network transmissions.

As used herein, the term "outbound transmission" may be replaced with "outbound connection" and vice versa, in embodiments. Similarly, the term "outbound transmission pattern" may be replaced with "outbound connection pattern" and vice versa, in embodiments.

By implementing pattern-based techniques to discover relationships, various embodiments allow for determining various communication relationships between host devices of networks, even though the network employ network address translation for communication between some or all of the host devices. Moreover, embodiments allow for determining such relationships without the need for packet inspection. Thus, embodiments allow for determining communication relationships between host devices in networks employing network address translation without the need to insert additional host-related identifying information into packet headers or packet bodies that are sent between host devices. Instead, standard network communication protocols may be used (e.g., transmission control protocol (TCP), user datagram protocol (UDP), hypertext transfer protocol (HTTP), and/or any other suitable network protocols), without the need to use modified communication protocols or non-standard/custom communication protocols. Moreover, by only requiring observation of timing and header data such as network IP address and/or port data (and in some embodiments, packet size), host relationships may be determined even in environments that prevent inspection of the packet body. Thus, host relationships may be determined while operating within existing permission access policies of the local network.

FIG. 1 illustrates a system for pattern-based techniques to discover relationships between hosts of a network, according to some embodiments. The hosts 100 depicted in FIG. 1 may be the same type of host, and include some or all of the same components as other hosts depicted in FIGS. 1-7, in embodiments. Although the network discovery manager 108 or network discovery service may be described as performing various actions, any of the actions described as performed by the network discovery manager 108 or network discovery service may be performed by any particular component of the network discovery manager 108 or network discovery service in FIGS. 1-11.

In the depicted embodiment, a network 102 includes the hosts 100a, 100b, 100c, 100d, and network address translators (NATs 104a and 104b). In embodiments, the network 102 may include any number of sub-networks comprising various hosts. Processes 106a, 106b, and 106c are running on host 100a, processes 106d, 106e, and 106f are running on host 100b, processes 106g and 106h are running on host 100c, and processes 106i and 106j are running on host 100d.

As shown, a network discovery manager 108 is connected to the network 102, via either a local network connection or a remote network connection. In embodiments, the network discovery manager 108 is a software application or software service running on one or more computing devices. As shown below, in some embodiments, the network discovery manager 108 may be a network discovery service of a remote provider network.

In embodiments, the network discovery manager 108 includes an agent deployer 110, an agent controller 112, a pattern recognition analyzer 114, and a network topology generator 116. As part of preparing the system for pattern-based techniques to discover relationships between hosts, the agent deployer 110 may deploy agents 118a, 118b, 118c, and 118d to host devices 100a, 100b, 100c, and 100d, respectively.

The network discovery manager 108 (e.g., the agent controller) may identify all hosts of the network 102 that an agent will be deployed to. For example, the network discovery manager 108 may generate and/or assign or obtain a unique host identifier (host ID) and/or network address for each host that an agent will be deployed to. In some embodiments, the network discovery manager 108 may generate and/or assign a unique agent identifier (agent ID) to each agent. In embodiments, the network discovery manager 108 may uniquely identify any given host with respect to other hosts based on the corresponding host ID and/or agent ID. For example, the network discovery manager 108 may determine that information received at the network discovery manager 108 was received by a particular host 100 based on a host ID and/or agent ID included with the received information.

In some embodiments, as part of preparing the system for pattern-based techniques to discover relationships, each agent collects (e.g., over a specified period of time) outbound transmission data that indicates a destination network address for respective outbound network transmissions that were initiated by the host device (e.g., a process on the host device) hosting the agent. Each agent may then send the collected outbound connection data to the network discovery manager 108.

For each of the agents, the network discovery manager 108 (e.g., agent controller 112) may determine one or more unique outbound connection patterns and then send the one or more outbound connection patterns to the agent. Each outbound connection pattern may indicate a unique sequence of network transmission events to a corresponding destination network address. In embodiments, at least some of the outbound connection patterns may each indicate a unique temporal sequence of network connection open requests and close requests to a corresponding destination network address (e.g., for TCP connections). In some embodiments, at least some of the outbound connection patterns may each indicate a unique temporal sequence of packet transmissions (or a unique rate of packet transmissions) to a destination network address and/or a unique size of each packet transmitted to a destination address (certain sized packets sent at a certain rate) (e.g., for UDP connections).

In some embodiments, after the agents receive corresponding outbound transmission patterns, the agents may perform outbound network transmissions at the host device according to the one or more outbound transmission patterns received at each agent. For example, the agent 118*a* may perform outbound network transmissions according to pattern 120*a*. In embodiments, each of the outbound network transmissions according to pattern 120*a* is to the same target destination that was used for outbound transmissions by the process 116*b*, in order to communicate between the process 116*b* of host 100*a* and the process 116*e* of host 100*b* (e.g., via TCP or UDP). For example, the process 116*b* may have established a TCP connection to communicate with process 116*e*, or the process 116*b* may have transmitted a packet to the process 116*e* via UDP protocol.

As shown, other agents may similarly perform outbound network transmissions to particular network destination addresses according to other patterns, based on transmissions that were initiated by other processes. For example, agent 118*b* performs outbound network transmissions according to pattern 120*b*, which corresponds to an outbound network transmission that was initiated by the process 116*d*, in order to communicate between the process 116*d* and the process 116*h*.

Similarly, agent 118*c* performs outbound network transmissions according to pattern 120*c*, which corresponds to an outbound network transmission that was initiated by the process 116*g*, in order to communicate between the process 116*g* and the process 116*c*. As depicted, agent 118*d* performs outbound network transmissions according to pattern 120*d*, which corresponds to an outbound network transmission that was initiated by the process 116*i*, in order to communicate between the process 116*i* and the process 116*a*. Likewise, agent 118*d* performs outbound network transmissions according to pattern 120*e*, which corresponds to an outbound network transmission that was initiated by the process 116*j*, in order to communicate between the process 116*j* and the process 116*f*.

In the example embodiment, the agents may also collect inbound transmission data at each host. The inbound transmission data may indicate inbound transmission events detected at each host, as well as a source for each of the inbound transmission events.

For example, agent 118*a* may collect inbound transmission data at the host 100*a* indicating inbound transmission events that correspond to patterns 120*c* and 120*d*, agent 118*b* collects inbound transmission data indicating inbound transmission events that correspond to patterns 120*a* and 120*e*, and agent 118*c* collects inbound transmission data indicating inbound transmission events that correspond to pattern 120*b*. In embodiments, an inbound transmission event may be a network open connection request followed by a network close connection request from a particular source address (e.g., for a TCP connection). In embodiments, an inbound transmission event may be a packet received and/or a size of the packet received (e.g., for TCP or UDP).

Each agent may then send the inbound transmission data to the network discovery manager 108. In embodiments, the pattern recognition analyzer 114 may analyze the inbound transmission data to identify occurrences of any of the outbound transmission patterns. In embodiments, the network discovery manager 108 may determine communication relationships between host devices of the network 102 based on the analysis. For example, the network discovery manager 108 may determine that a temporal sequence of inbound transmission events for a particular source or destination network address (and port number) matches one of the outbound transmission patterns that was provided to a particular host and/or agent.

In some embodiments, each of the outbound transmission patterns is associated with a particular host and/or agent by associating the outbound transmission pattern with the host ID and/or agent ID of the particular host and/or agent (e.g., via a list, table, or any other data or metadata linking a host ID and/or agent ID with a given outbound transmission pattern (and any other data associated with the pattern, such as destination address/port, etc.). Thus, the network discovery manager 108 may make any of the above determinations based at least on the associations between the each of the outbound transmission patterns and the host IDs and/or agent IDs.

Figure 2:
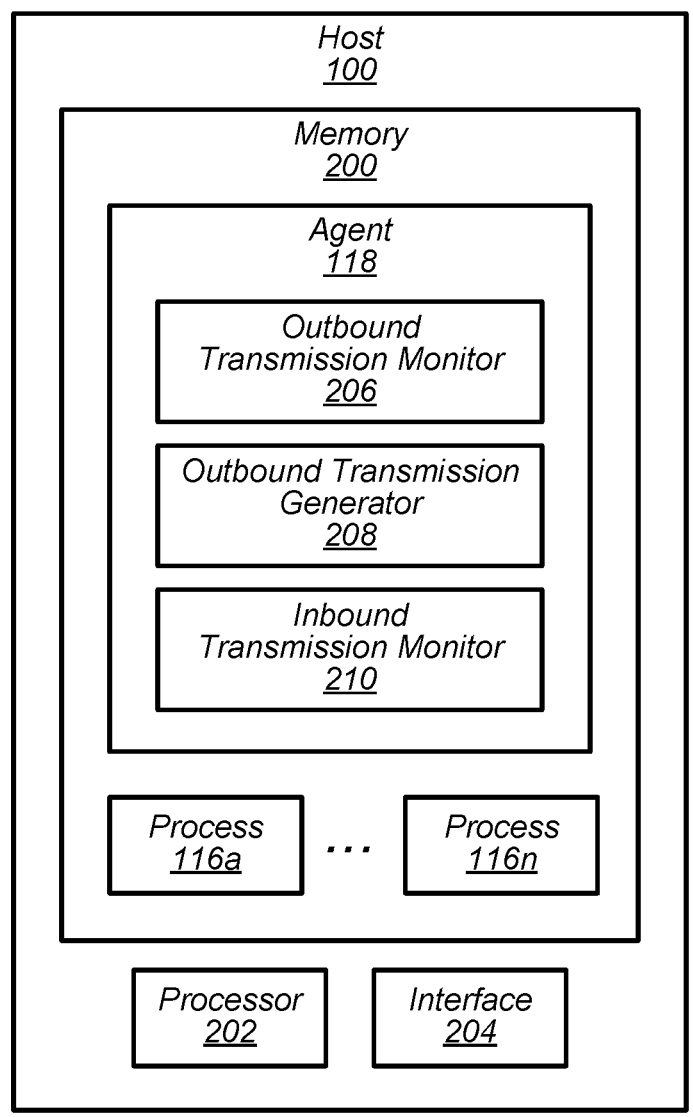
FIG. 2 is a block diagram illustrating example components that implement an agent at a host, according to some embodiments.

FIG. 2 is a block diagram illustrating example components that implement an agent at a host, according to some embodiments. In the depicted embodiment, the host 100 includes a memory 200, a processor 202, and a network interface 204. The memory includes an agent 118 and processes 116. The agent includes an outbound transmission monitor 206, an outbound transmission generator 208, and an inbound transmission monitor 210.

In some embodiments, the outbound transmission monitor 206 may collect (e.g., over a specified period of time) outbound connection data that indicates a destination network address for respective network connections that were initiated by the host 100 (e.g., by a process on the host 100) hosting the agent. In embodiments, the outbound transmission generator 208 may perform outbound network connections at the host 100 according to the received one or more outbound connection patterns. In the depicted embodiment, the inbound transmission monitor 210 may collect inbound transmission data indicating transmission events detected at the host 100, as well as a source for each of the transmission events.

In embodiments, the network interface 204 communicatively couples the host 100 to the local network. Thus, the host 100 transmits data to and receives data from one or more other hosts via the network interface 204. In embodiments, the network interface 204 may transmit and receive data via a wired or wireless interface.

FIG. 3 illustrates an example data structure that stores outbound transmission pattern assignments, according to some embodiments. In embodiments, outbound transmission pattern assignments 302 may be used by the outbound transmission generator 208 of an agent to perform outbound network transmissions at the host 100 according to received outbound transmission patterns. In some embodiments, the agent may determine if each of the pattern assignments of outbound transmission pattern assignments 302 is unique, and if not, the agent may not use duplicate pattern assignments to generate patterns. The agent may also send an indication/message to the discovery manager to report on the duplicate pattern assignments.

As shown, for each outbound transmission pattern assignment, outbound transmission pattern assignments 302 specifies a source IP address 304, a source port 306, a destination IP address 308, a destination port 310, and pattern timing 312. For example, pattern assignment 314 indicates pattern timing of 2 seconds, 4 seconds, 9 seconds, and a pause of 180 seconds before repeating the pattern. As shown, there are three other pattern assignments 316, 318, and 320. In the example, the pattern timing for pattern assignment 320 has not yet been assigned.

In some embodiments, the outbound transmission pattern assignments 302 also specifies a network protocol 322 (e.g., TCP or UDP) to be used when performing the outbound transmission. The pattern repeat/time 324 may specify how many times or how long to repeat the outbound transmissions in accordance with the pattern assignment. Thus, the agent or the network discovery manager may send an instruction to stop performing the outbound transmissions for a particular pattern after the time has expired or after it has repeated the specified number of times. In embodiments, the protocol 322 also determines what type of outbound transmission event to be performed.

As an example, to perform an outbound transmission in accordance with pattern assignment 318, a packet with a source IP address "B," source port "51973," destination IP address "Z," and destination port "49789" is transmitted via UDP protocol once, then again after 5 seconds, then again after two seconds, then again after 3 seconds, and then pauses for 100 seconds before repeating the same pattern. According to the patter repeat/time, this process would repeat 200 times.

In some embodiments, the pattern assignment 318 may also specify a particular size of the packet to be transmitted. For example, the pattern assignment 318 may specify that each packet is to be a size of 2017 bytes. In embodiments, the packets sizes may be different. For example, the first may be specified at 2017 bytes, the second as 2027 bytes, the third as 2077 bytes, and the fourth as 3013 bytes.

As another example, pattern assignment 314 indicates that an outbound connection request is to be transmitted via TCP protocol using source IP address A (e.g., 254.8.24.2), source port 50272, destination IP address X, and destination port 80 an initial time, then closed (e.g. after a specified time interval, such as 1 second), sent again after two seconds (then closed), sent again after 9 seconds (then closed), sent again after 180 seconds (then closed), sent again after 2 seconds, etc. (e.g., repeating for a specified number of times, for a specified period of time, or indefinitely). According to the patter repeat/time, this process would repeat 100 times.

FIG. 4 illustrates an example data structure that stores inbound transmission data, according to some embodiments. In embodiments, inbound transmission data 402 may be stored and/or accessed by an agent and/or by a network discovery manager.

As shown, a source IP address 404, source port 406, destination IP address 408, destination port 410, open connection timestamp 412, and close connection timestamp 414 is specified for at least some of inbound transmissions 416, 418, 420, 422, 424, 426, 428, and 430. In embodiments, a protocol 432 may also be specified for each inbound transmission. In the depicted embodiment, inbound transmission data 402 indicates a particular open connection pattern of 2 seconds, 4 seconds, 9 seconds, and 180 seconds that repeats again after the 180 second pause (using the TCP protocol). This pattern can be identified because it is unique to source IP address "Q," source port "61532," destination IP address "S," and destination port "80."

As another example, inbound transmission data 422 indicates a packet was received with a source IP address "P," source port "52555," destination IP address "X," and destination port "50210." In embodiments, source IP address "P" is unique with respect to any other source IP addresses within inbound transmission data 402. In some embodiments, inbound transmission data 402 may also specify a size of the data packet received. As discussed above, a UDP-based pattern may be identified based on receiving a unique temporal sequence of packets from a particular source IP address and/or source port, and in some cases also based on determining the size of each of the received packets.

In embodiments, only the source IP address "Q" may be sufficient to identify the above pattern as originating from a particular host because source IP address "Q" may be unique with respect to any of the other source IP addresses within the inbound transmission data 402. In embodiments, any combination of one or more of the source IP address, source port, destination IP address, and destination port may be unique with respect to a particular host, and may therefore be sufficient to identify a particular pattern as originating from the particular host.

Figure 5:
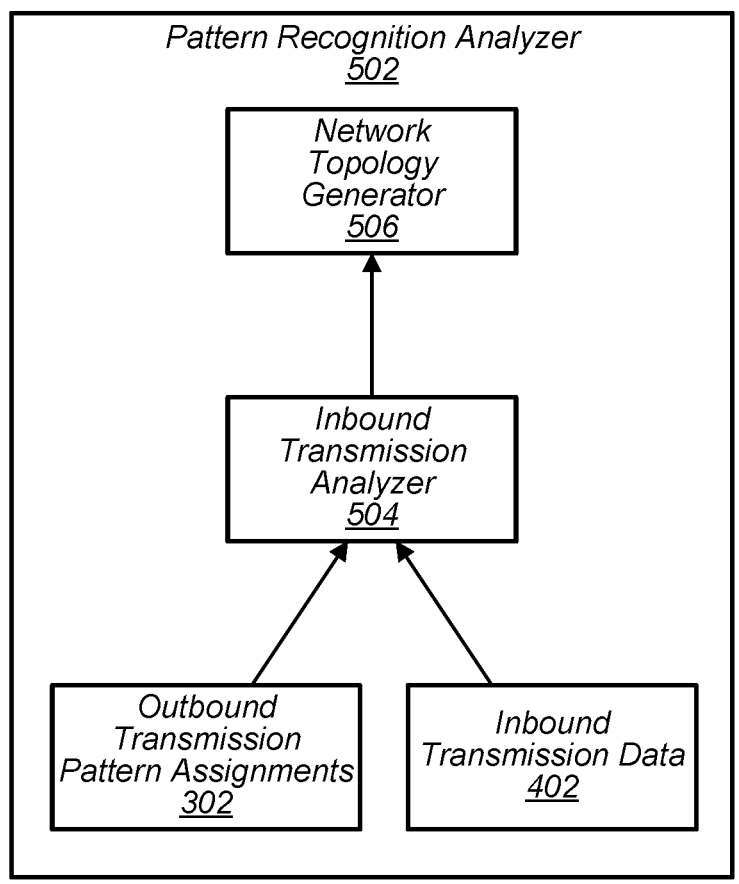
FIG. 5 is a block diagram illustrating example components that implement a pattern recognition analyzer, according to some embodiments.

FIG. 5 is a block diagram illustrating example components that implement a pattern recognition analyzer, according to some embodiments. As illustrated, a pattern recognition analyzer 502 includes an inbound transmission analyzer 504 that accepts as input the outbound transmission pattern assignments 302 and the inbound transmission data 402 for hosts of a network employing address translation.

In embodiments, the inbound transmission analyzer 504 analyzes the inbound transmission data 402 to identify occurrences of different outbound transmission patterns 120 (e.g., patterns that were previously provided to agents to perform outbound network transmissions). The inbound transmission analyzer 504 may determine, based on the analysis of the inbound transmission data 402, communication relationships between host devices on the networks.

In some embodiments, the inbound transmission analyzer 504 may then provide the communication relationships to a network topology generator 506. The network topology generator 506 may then generate a visualization (e.g., via a display screen, printout, or other visualization) of a network topology based on the communication relationships. For example, the network topology generator 506 may generate a topology map of a network (e.g., network 102) than depicts various hosts as nodes, as well as edges between nodes that represent communication pathways between hosts and/or processes of hosts. In embodiments, the network topology generator 506 may instead or in addition print out a table, list, or chart that shows the communication relationships.

Figure 6:
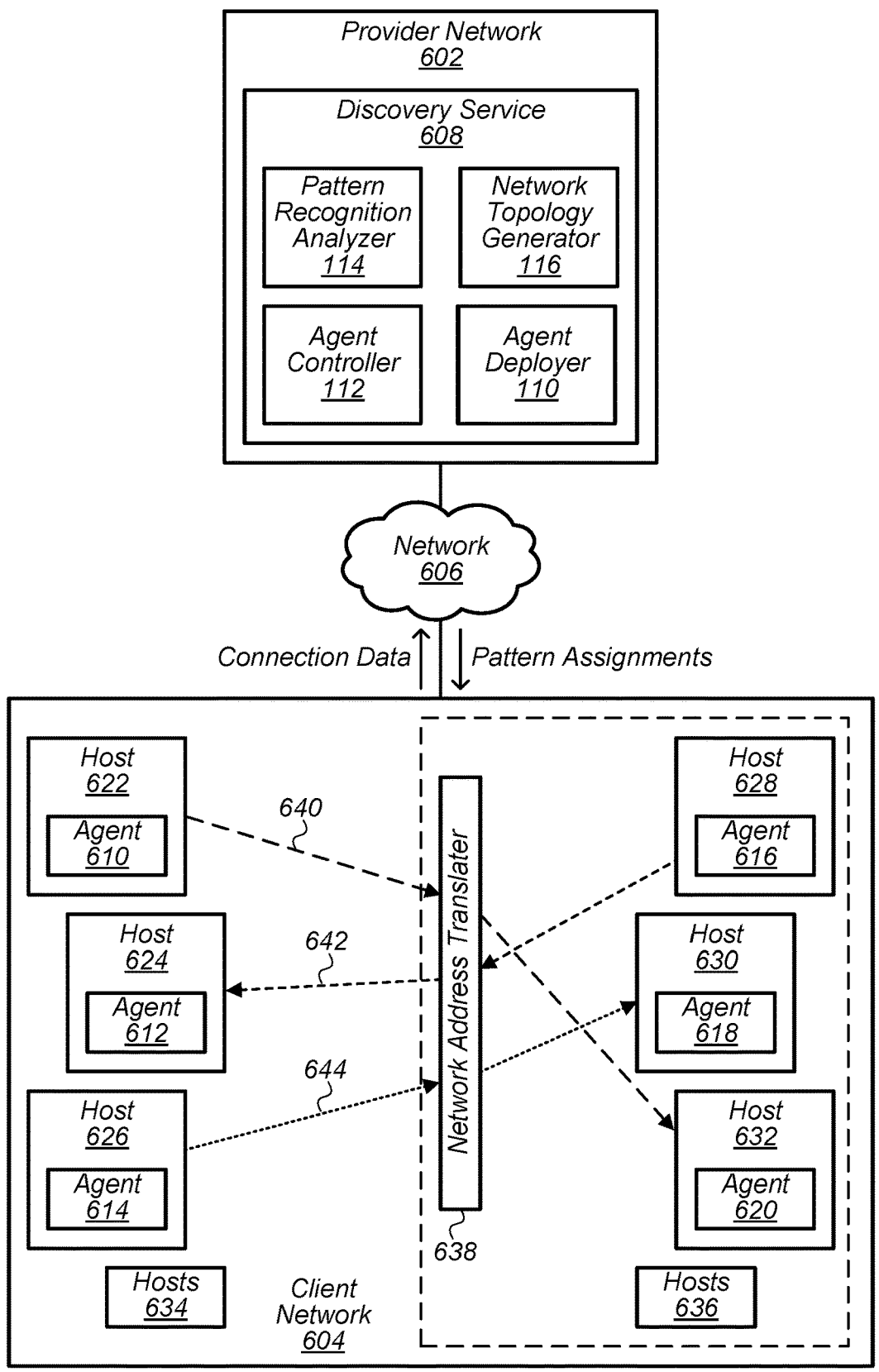
FIG. 6 illustrates a system for pattern-based techniques to discover relationships between hosts of a network, according to some embodiments.

FIG. 6 illustrates a system for pattern-based techniques to discover relationships between hosts of a network, according to some embodiments. In the depicted embodiment, a remote provider network 602 is connected to a client network 604 via a wide area network 606 (e.g., the Internet) and includes a discovery service 608 that implements some or all of the functionality of the network discovery manager 108. For example, the discovery service 608 may include the agent deployer 110, agent controller 112, pattern recognition analyzer 114, and network topology generator 116.

Similar to FIG. 1, the agent deployer 110 may deploy agents 610, 612, 614, 616, 618, and 620 to host devices 622, 624, 626, 628, 630, and 632, respectively. The client network 604 may include various other hosts 634 and 636. In the depicted embodiment, the hosts 628, 630, 632, and 636 communicate to other components of the client network 604 via a NAT 638.

As described for the network discovery manager 108 of FIG. 1, the discovery service 608 may provide unique transmission patterns 640, 642, and 644 to agents 610, 616, and 614, respectively. Thus, as described for FIG. 1, the transmission patterns 640, 642, and 644 (and any others provided to client network 604) may be used by the discovery service 608 to determine communication relationships between host devices of the network 604.

Figure 7:
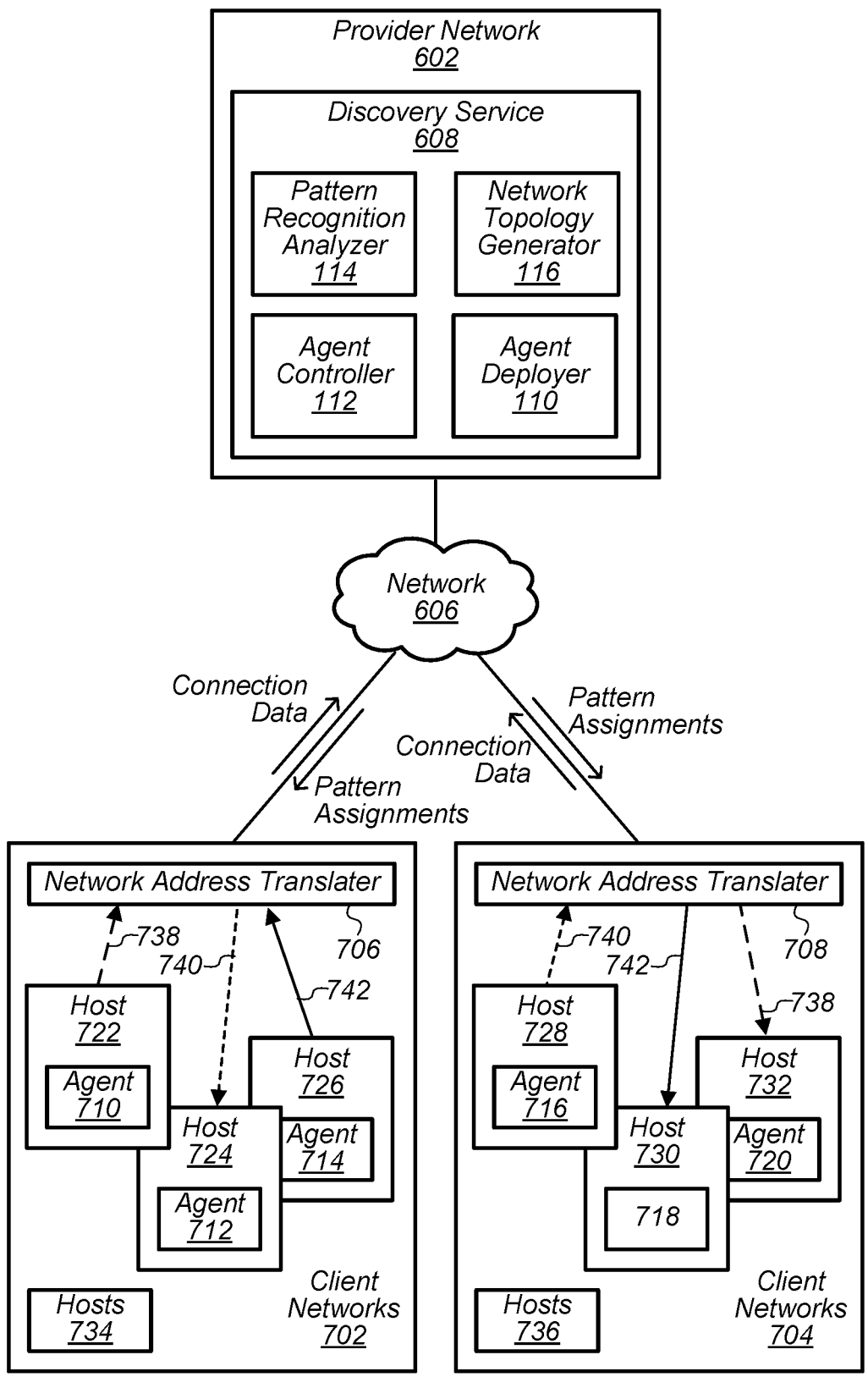
FIG. 7 illustrates a system for pattern-based techniques to discover relationships between hosts of two networks, according to some embodiments.

FIG. 7 illustrates a system for pattern-based techniques to discover relationships between hosts of two networks, according to some embodiments. As shown, the remote provider network 602 includes the discovery service 608 and is connected to a client network 702 via a wide area network 606 (e.g., the Internet). The remote provider network 602 is also connected to another client network 704 via network 606. In embodiments, the same client may own or manage both of the client networks 702, 704.

As shown, hosts of the network 702 may communicate with hosts of the network 704 via the network 606. In embodiments, network 702 may be in a different geographic location than the network 704 (e.g., remote from network 704). For example, networks 702 and 704 may be a part of two respective data centers used by the same or different organization.

As depicted, hosts of the client network 702 communicate to other hosts via a NAT 706 and hosts of the client network 704 communicate to other hosts via a NAT 708. In some embodiments, only one of the networks may employ a NAT. In various other embodiments, each network 702, 704 may use any other number of NATs.

Similar to FIGS. 1 and 6, the agent deployer 110 may deploy agents 710, 712, 714, 716, 718, and 720 to host devices 722, 724, 726, 728, 730, and 732, respectively. The client networks 702 and 704 may each include various other hosts 734 and 736. In the depicted embodiment, the hosts 710, 712, 714 communicate to hosts 716, 718, and 720 via NATs 706 and 708. In embodiments, each of the hosts may communicate with each other via any other number of NATs.

As described for the network discovery manager 108 of FIG. 1, the discovery service 608 may provide unique transmission patterns 738, 740, and 742 to agents 710, 716, and 714, respectively. Thus, as described for FIG. 1, the transmission patterns 738, 740, and 742 (and any others provided to client network 604) may be used by the discovery service 608 to determine communication relationships between host devices of the networks 704 and 704. In embodiments, the discovery service 608 may perform a similar process to deploy agents to hosts of any other number of different networks (e.g., separated by network 606) to determine communication relationships between host devices of the different networks.

In embodiments, any number of clients may use the discovery service 608 to perform pattern-based techniques to discovery relationships between hosts. Thus, the discovery service 608 may be a multi-tenant service, and provide any of the described services to any number of clients. For example, one client may use the discovery service 608 for one or more networks of the client, while any number of other clients may use the discovery service 608 for one or more other networks of each of the other clients. In embodiments, each client may have an account and/or account identifier assigned to the client by the provider network and stored by the discovery service 608. The account identifier may be used by the client and/or discovery service 608 to provide any of the discussed services to the client. In embodiments, one or more security credentials may also be provided by the client to use services.

Figure 8:
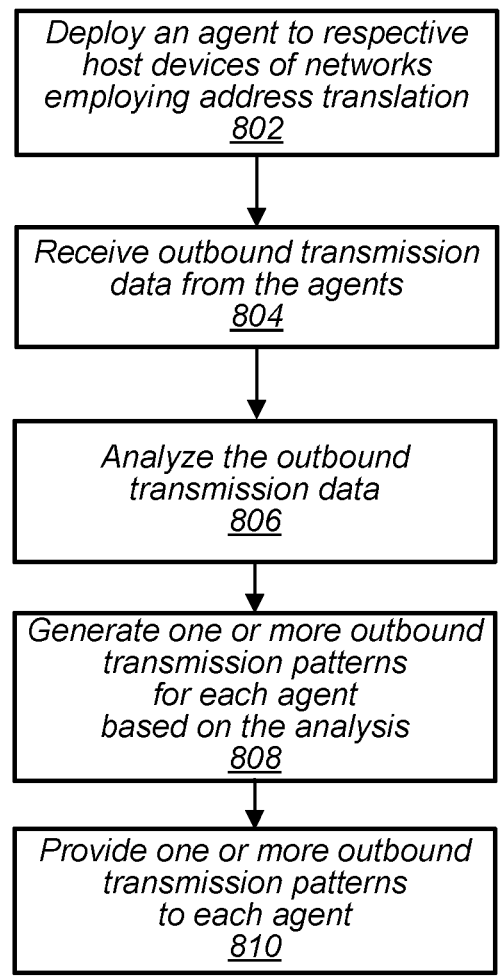
FIG. 8 is a flow diagram of a process for configuring agents with unique outbound transmission patterns, according to some embodiments.

FIG. 8 is a flow diagram of a process for configuring agents with unique outbound transmission patterns, according to some embodiments. One or more portions of the illustrated processes of FIGS. 8-11 may be performed via one or more components of a network discovery manager/service and/or agents/hosts (e.g., the network discovery manager 108 or the network discovery service 608).

At block 802, a network discovery manager deploys an agent to respective host devices of networks employing address translation. At block 804, the discovery manager receives outbound transmission data from agents. At block 806, the discovery manager analyzes the outbound transmission data.

At block 808, the discovery manager generates one or more outbound transmission patterns for each agent based on the analysis. At block 810, the discovery manager provides one or more outbound transmission patterns to each agent. In some embodiments, the discovery manager may wait to receive additional outbound connection data from agents, and repeat blocks 806-810 to generate and provide additional outbound transmission patterns to one or more agents.

Figure 9:
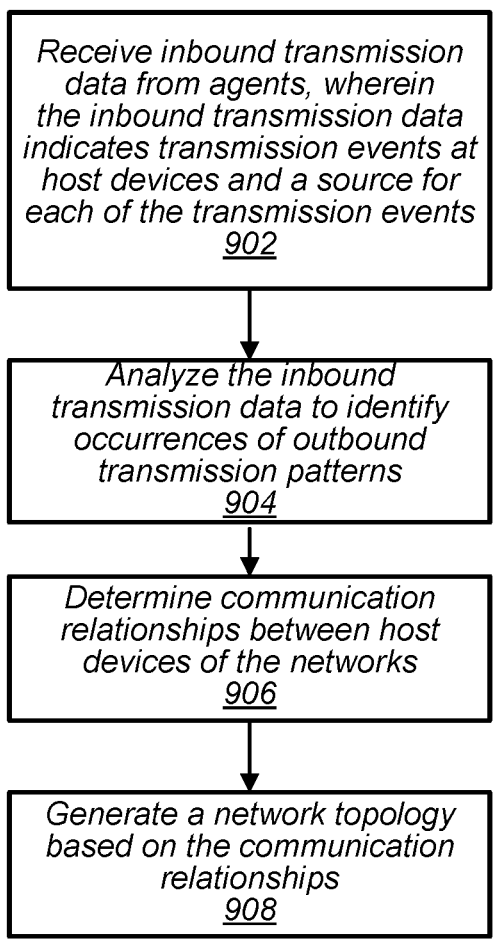
FIG. 9 is a flow diagram of a process for determining relationships between hosts of a network based on occurrences of outbound transmission patterns at hosts, according to some embodiments.

FIG. 9 is a flow diagram of a process for determining relationships between hosts of a network based on occurrences of outbound transmission patterns at hosts, according to some embodiments. At block 902, the discovery manager receives inbound transmission data from the agents, wherein the inbound transmission data indicates transmission events at host devices, and also receives a source for each of the transmission events.

At block 904, the discovery manager analyzes the inbound transmission data to identify occurrences of outbound transmission patterns. At block 906, the discovery manager determines communication relationships between host devices of the networks. At block 908, the discovery manger generates a network topology based on the communication relationships.

In some embodiments, the inbound transmission data further indicates a destination for the respective ones of the transmission events, and the discovery manager determines communication relationships between one or more processes of host devices and one or more other processes of other the host devices. In embodiments, the destination includes a network address and a port number for each network transmission event, and to determine a communication relationship between two processes, the discovery manager determines that a sequence of transmission events for a particular network address and port number (e.g., one that was used by a particular process at the host) matches one of the outbound transmission patterns (e.g., corresponding to an outbound transmission initiated by another process of another host).

In embodiments, the inbound transmission data includes data one or more TCP connections. Thus, the inbound transmission data includes an open connection timestamp and a close connection timestamp for each of the network connection open and close events for a particular source IP address. Thus, to identify occurrences of different outbound connection patterns, the discovery manager may determine network connection open and close events that occur within a threshold period of time based on the open connection timestamp and the close connection timestamp for each of the network connection open and close events. For example, to identify occurrences of different outbound connection patterns, the discovery manager may only consider network connection open and close events that occur within a threshold period of time (e.g., pre-determined period of time, such as during configuration and setup).

Figure 10:
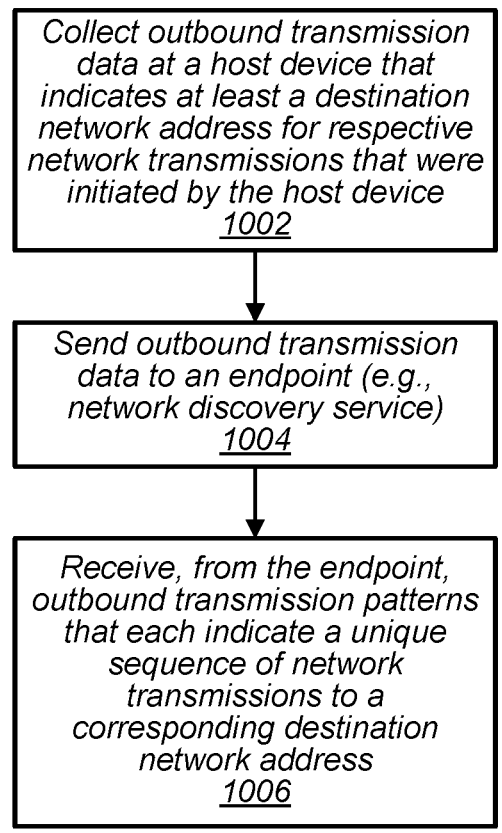
FIG. 10 is a flow diagram of a process for obtaining outbound transmission patterns for use by agents, according to some embodiments.

FIG. 10 is a flow diagram of a process for obtaining outbound transmission patterns for use by agents, according to some embodiments. At block 1002, an agent collects outbound transmission data at a host device that indicates at least a destination network address for respective network transmissions that were initiated by the host device. In some embodiments, the outbound transmission data may also indicate a port number for the outbound network transmission that was initiated by the host device (e.g., a port used by a process).

At block 1004, the agent sends the outbound transmission data to an endpoint (e.g., the network discovery service). At block 1006, the agent receives, from the endpoint, outbound transmission patterns that each indicate a unique sequence of network transmissions to a corresponding destination network address. As discussed above, for TCP connections, the outbound transmission patterns may each indicate a unique temporal sequence of network connection open and close requests to a corresponding destination network address (and in some cases, a size for each of one or more packets transmitted during each connection). For UDP connections, the outbound transmission patterns may each indicate a unique temporal sequence of packet transmissions to a corresponding destination network address (and in some cases, a size for each of the packets).

Figure 11:
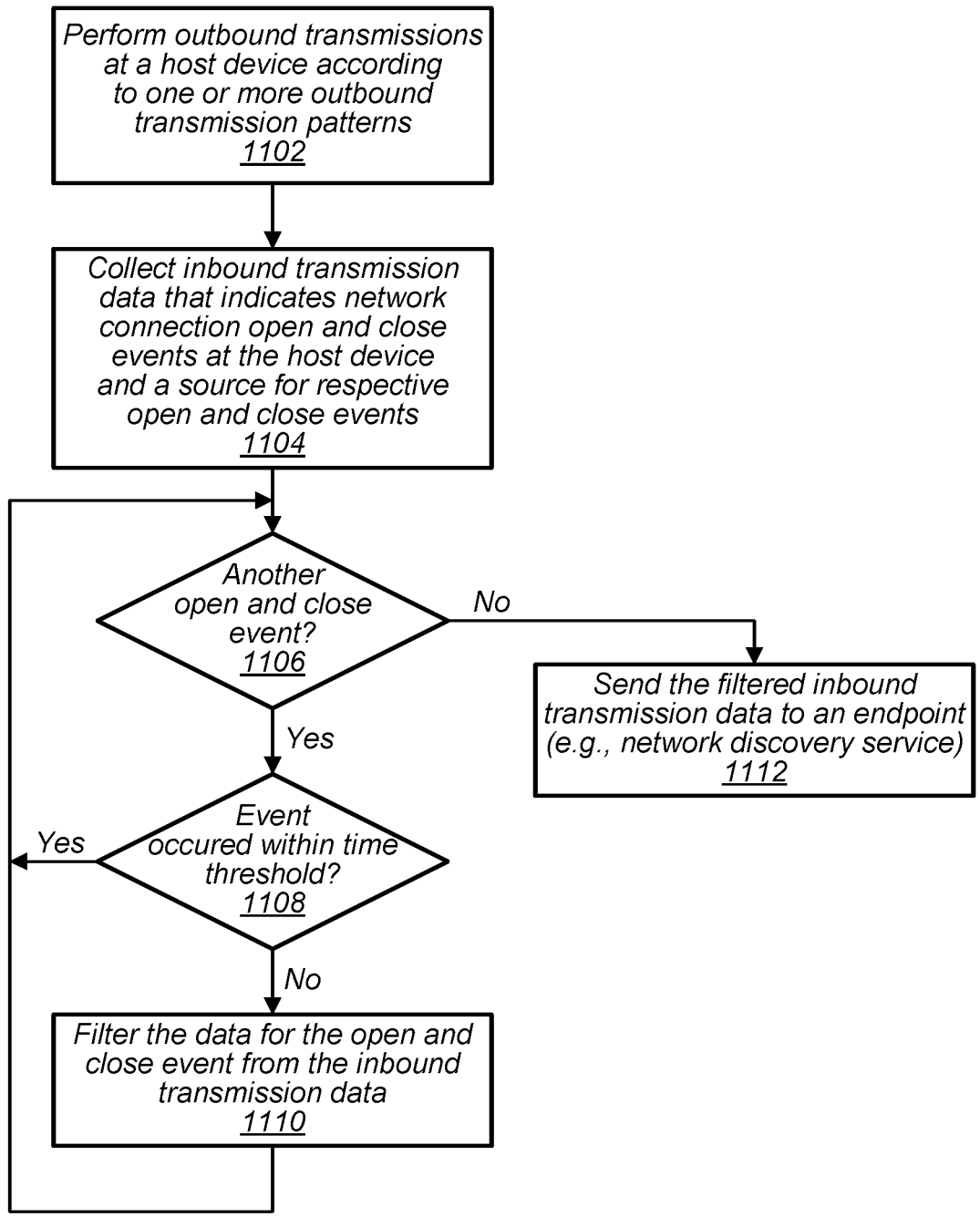
FIG. 11 is a flow diagram of a process for performing outbound transmission at a host device according to outbound transmission patterns and obtaining inbound transmission data at the host device, according to some embodiments.

FIG. 11 is a flow diagram of a process for performing outbound connections at a host device according to outbound transmission patterns and obtaining inbound transmission data at the host device, according to some embodiments. At block 1102, an agent performs outbound transmissions at a host device according to one or more outbound transmission patterns.

At block 1104, the agent collects inbound transmission data that indicates network connection open and close events at the host and a source for respective open and close events. In embodiments, the inbound transmission data may indicate a destination (e.g., network address and/or port number) for each of the network connection open and close events.

At block 1106, to process the data, the agent determines whether there is another open and close event in the data. If so, then at block 1108, the agent determines whether the open and close event occurred within a time threshold (e.g., within 1 second, or any other suitable period of time). If so, then the agent returns to block 1106 to determine whether there is another open and close event in the data. However, if the agent determines that the open and close event did not occur within a time threshold, then at block 1110, the agent filters (e.g., deletes and/or removes) the data for the open and close event from the inbound transmission data. The process then returns to block 1106.

In some embodiments, the agent may also filter out (e.g., delete and/or remove) data for an open and close event if the open and close event does not occur over at least another threshold period of time (e.g., if the event does not occur over at least a half second time period). Thus, in embodiments, the agent may remove data for connections that do not last a minimum amount of time and events that exceed a maximum amount of time. Further, in some embodiments, the discovery manager may take into account the amount of time each connection is open as an additional unique pattern signature/feature when performing pattern recognition.

If, at block 1106, the agent determines that there is not another open and close event in the data to process, then at block 1212, the agent sends the filtered inbound transmission data to an endpoint (e.g., network discovery service). In embodiments, the agent continues to monitor inbound transmission data and the process begins again at block 1104 after the agent transmits new inbound transmission data to the discovery service. In some embodiments, the agent does not filter the data before sending it to the endpoint. In such cases, the process would proceed from block 1104 to block 1112.

Figure 12:
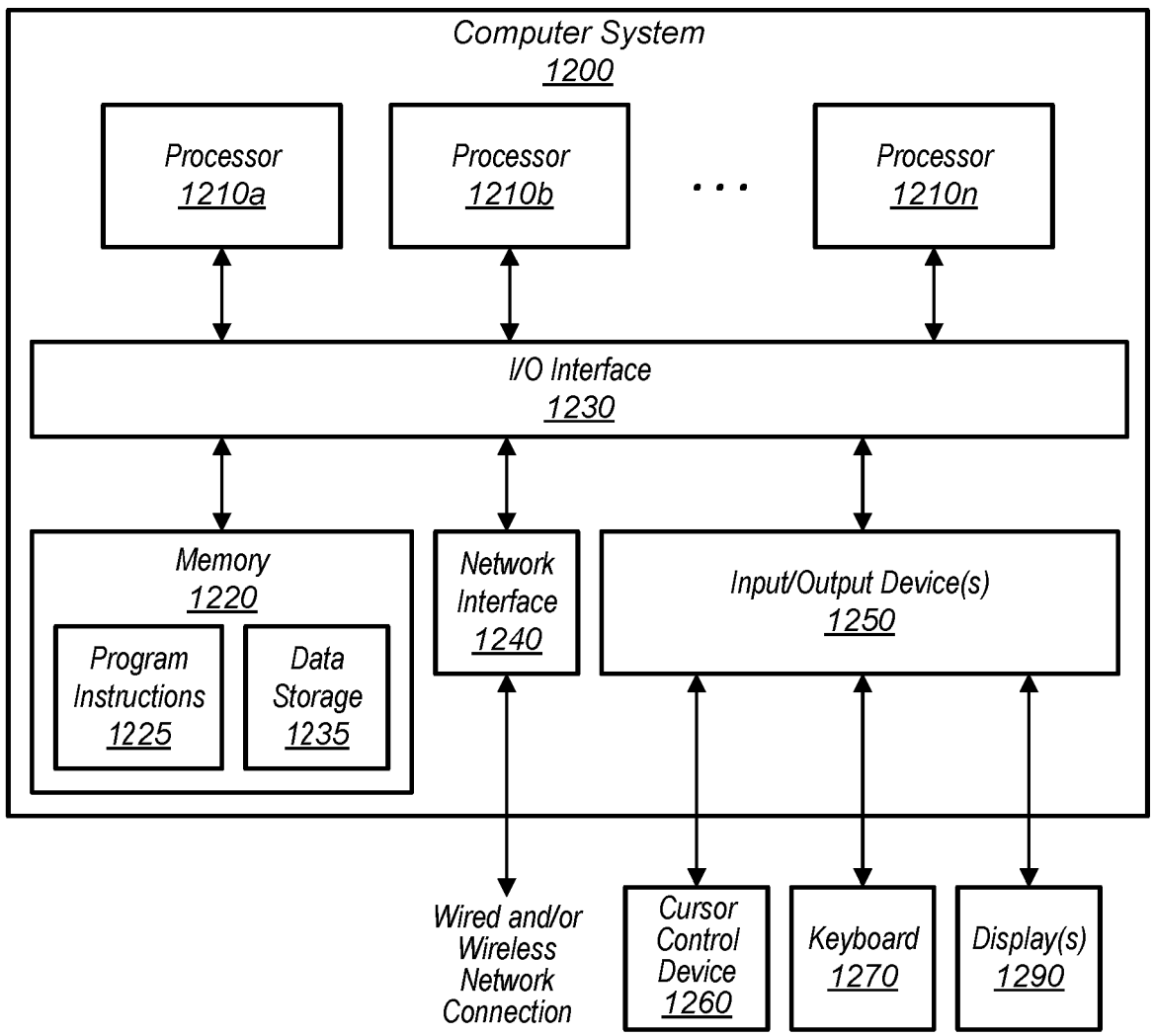
FIG. 12 is a block diagram illustrating an example computer system that implements some or all of the techniques described herein, according to some embodiments.

Any of various computer systems may be configured to implement processes associated with pattern-based techniques to discover relationships between hosts. For example, FIG. 12 is a block diagram illustrating one embodiment of a computer system suitable for implementing at least some of the systems and methods described herein. In various embodiments, the hosts 100, NATs, and/or computing devices that implement the network discovery manager 108 or discovery service 608, or any other described components, may each include one or more computer systems 1200 such as that illustrated in FIG. 12 or one or more components of the computer system 1200 that function in a same or similar way as described for the computer system 1200.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230. In some embodiments, computer system 1200 may be illustrative of servers implementing enterprise logic or downloadable application, while in other embodiments servers may include more, fewer, or different elements than computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be embedded processors implementing any of a variety of instruction set architectures (ISAs), such as the x106, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor 1210. In various embodiments, system memory 1220 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or service provider are shown stored within system memory 1220 as program instructions 1225. In some embodiments, system memory 1220 may include data 1235 which may be configured as described herein.

In one embodiment, I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as between the shippable storage device 100 and other computer systems, for example. In particular, network interface 1240 may be configured to allow communication between computer system 1200 and/or various I/O devices 1250. I/O devices 1250 may include scanning devices, display devices, input devices and/or other communication devices, as described herein. Network interface 1240 may commonly support one or more wireless networking protocols (e.g., Wi-Fi/IEEE 802.7, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1200 via I/O interface 1230. A computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

In some embodiments, I/O devices 1250 may be relatively simple or "thin" client devices. For example, I/O devices 1250 may be configured as dumb terminals with display, data entry and communications capabilities, but otherwise little computational functionality. However, in some embodiments, I/O devices 1250 may be computer systems configured similarly to computer system 1200, including one or more processors 1210 and various other devices (though in some embodiments, a computer system 1200 implementing an I/O device 1250 may have somewhat different devices, or different classes of devices).

In various embodiments, I/O devices 1250 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1250 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1200. In general, an I/O device 1250 (e.g., cursor control device, keyboard, or display(s) may be any device that can communicate with elements of computing system 1200.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the network discovery manger, network discovery service, agents, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
    one or more computing devices configured to:
        deploy an agent to respective host devices of networks employing address translation;
        for individual ones of the agents:
            determine one or more outbound transmission patterns, wherein each outbound transmission pattern indicates a unique sequence of a plurality of network transmissions to a corresponding destination network address; and
            provide the one or more outbound transmission patterns to the agent;
        receive inbound transmission data from the agents, wherein the inbound transmission data indicates at least:
            a plurality of transmission events at the host devices, and
            a source for respective ones of the transmission events;
        analyze the inbound transmission data to identify occurrences of different ones of the outbound transmission patterns; and
        determine, based at least on the analysis of the inbound transmission data, communication relationships between host devices on the networks.

2. The system as recited in claim 1, wherein the inbound transmission data further indicates a destination for the respective ones of the transmission events, and wherein to determine the communication relationships between host devices on the networks, the one or more computing devices are configured to:
    determine a communication relationship between one or more processes of one or more of the host devices and one or more other processes of another one or more of the host devices.

3. The system as recited in claim 2, wherein the destination comprises a network address and a port number for the respective ones of the transmission events, and wherein to determine a communication relationship between a particular process and another particular process, the one or more computing devices are configured to:

determine that a temporal sequence of a plurality of the transmission events for a particular network address and port number matches one of the outbound transmission patterns.

4. The system as recited in claim 1, wherein the inbound transmission data comprises an open connection timestamp and a close connection timestamp for respective ones of the transmission events, and wherein to analyze the inbound transmission data to identify occurrences of different ones of the outbound transmission patterns, the one or more computing devices are configured to:

determine network connection open and close events that occur within a threshold period of time based on the open connection timestamps and the close connection timestamps.

5. The system as recited in claim 1, wherein to determine the one or more outbound transmission patterns for a particular agent, the one or more computing devices are configured to:

receive outbound transmission data from the particular agent, wherein the outbound transmission data indicates one or more outbound network connections established for processes running on a host device hosting the particular agent;

analyze the outbound transmission data; and generate the one or more outbound transmission patterns for the particular agent based on the analysis, wherein each of the outbound transmission patterns indicates a unique temporal sequence of a plurality of network transmissions to a corresponding destination network address.

6. A method, comprising:

performing, by one or more computing devices:

for individual host devices of one or more networks employing address translation:

determining one or more outbound transmission patterns, wherein each outbound transmission pattern indicates a unique sequence of network transmissions to a corresponding destination network address; and providing the one or more outbound transmission patterns to the host device;

receiving inbound transmission data from one or more of the host devices, wherein the inbound transmission data indicates at least:

a plurality of transmission events at the one or more of the host devices, and a source for respective ones of the transmission events;

analyze the inbound transmission data to identify at least one occurrence of the one or more of the outbound transmission patterns; and determine, based at least on the analysis of the inbound transmission data, one or more communication relationships between host devices on the one or more networks.

7. The method as recited in claim 6, further comprising:

deploying an agent to respective ones of the host devices of the one or more networks;

for individual agents:

determining the one or more outbound transmission patterns; and providing the one or more outbound transmission patterns to the agent, wherein each of the outbound transmission patterns indicates a unique temporal sequence of network transmissions to the corresponding destination network address; and receiving inbound transmission data from one or more of the agents.

8. The method as recited in claim 6, wherein the inbound transmission data further indicates a destination for the respective ones of the transmission events, and wherein the determining of the communication relationships comprises:

determining the communication relationship between one or more processes of one or more of the host devices and one or more other processes of another one or more of the host devices.

9. The method as recited in claim 8, wherein the destination comprises a network address and a port number for the respective ones of the transmission events, and wherein the determining of the communication relationships comprises:

determining that a temporal sequence of a plurality of the transmission events for a particular network address and port number matches one of the outbound transmission patterns.

10. The method as recited in claim 6, wherein the inbound transmission data comprises an open connection timestamp and a close connection timestamp for respective ones of the transmission events, and wherein the analyzing of the inbound transmission data to identify occurrences of different ones of the outbound transmission patterns further comprises:

determining network connection open and close events that occur within a threshold period of time based on the open connection timestamps and the close connection timestamps.

11. The method as recited in claim 6, wherein each outbound transmission pattern indicates one or more of:

a sequence of packet transmissions to a destination network address and a size of respective packets of the packet transmissions, a unique temporal sequence of packet transmissions to a destination network address, or a unique temporal sequence of network connection open and close requests to a destination network address.

12. The method as recited in claim 6, wherein, for a particular host device, the determining of the one or more outbound transmission patterns comprises:

receiving outbound transmission data from the particular host device, wherein the outbound transmission data indicates one or more outbound network connections established for processes running on the host device;

analyzing the outbound transmission data; and generate the one or more outbound transmission patterns for the particular agent based on the analysis.

13. The method as recited in claim 6, further comprising:

generating a visualization of a network topology based on the one or more communication relationships between host devices on the one or more networks.

14. A non-transitory computer-accessible storage medium storing program instructions that when executed on one or more processors:

collect outbound transmission data at a host device that indicates at least a destination network address for respective network transmissions that were initiated by the host device;

send the outbound transmission data from the host device to an endpoint;

receive, from the endpoint, one or more outbound transmission patterns, wherein each outbound transmission pattern indicates a unique sequence of a plurality of network transmissions to a corresponding destination network address indicated by the outbound transmission data;

perform outbound network transmissions at the host device according to the one or more outbound transmission patterns;

collect inbound transmission data at the host device, wherein the inbound transmission data indicates at least:
- a plurality of transmission events detected at the host device, and
- a source for respective ones of the transmission events; and send the inbound transmission data from the host device to the endpoint, wherein the inbound transmission data indicates one or more other outbound transmission patterns received by the host device from one or more other host devices, and wherein the received one or more other outbound transmission patterns are indicative of one or more communication relationships between the host device and the one or more other host devices.

15. The storage medium as recited in claim 14, wherein the inbound transmission data further indicates a destination for the respective ones of the transmission events.

16. The storage medium as recited in claim 15, wherein the destination comprises a network address and a port number for the respective ones of the transmission events.

17. The storage medium as recited in claim 14, wherein the outbound transmission data further indicates a port number for the respective network transmissions that were initiated by the host device.

18. The storage medium as recited in claim 14, wherein the inbound transmission data comprises an open connection timestamp and a close connection timestamp for respective network connection open and close events.

19. The storage medium as recited in claim 18, wherein the program instructions when executed on one or more processors:
filter data for particular ones of the transmission events from the inbound transmission data based on one or more of the open connection timestamp and the close connection timestamp for the respective ones of the network connection open and close events.

20. The storage medium as recited in claim 14, wherein each outbound transmission pattern indicates one or more of:
a unique temporal sequence of packet transmissions to a destination network address, or
a unique temporal sequence of network connection open and close requests to a destination network address.

* * * * *